April 7, 1931.  D. O. FARRINGTON  1,800,061
VEHICLE DOOR BUMPER
Original Filed May 24, 1929
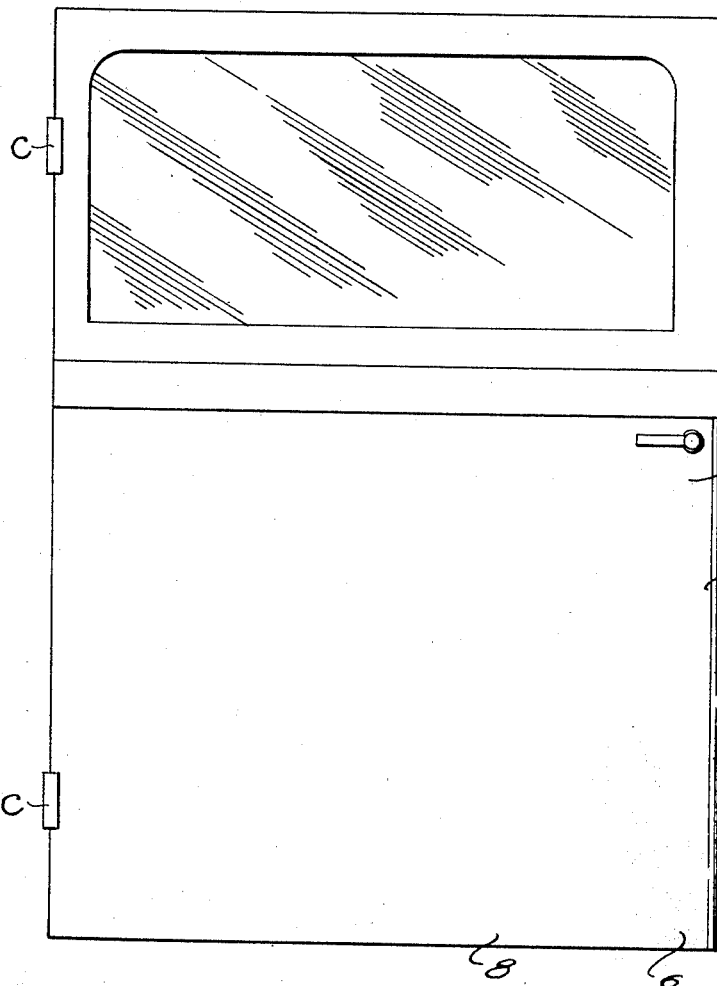
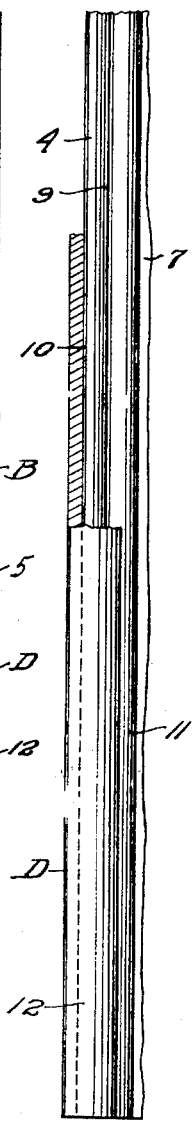
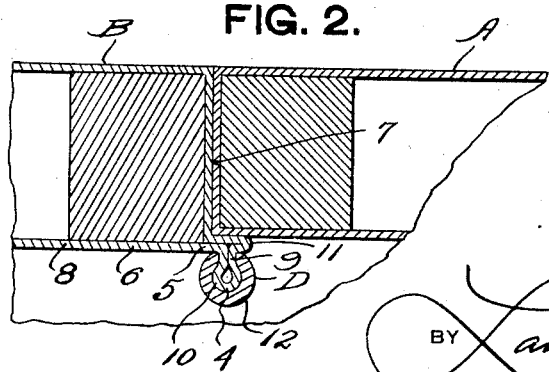
INVENTOR:
Duane O. Farrington Patented Apr. 7, 1931

1,800,061

UNITED STATES PATENT OFFICE

DUANE O. FARRINGTON, OF RIVERSIDE, CALIFORNIA

VEHICLE DOOR BUMPER

Original application filed May 24, 1929, Serial No. 365,726. Divided and this application filed January 16, 1930. Serial No. 421,298.

The present invention relates to bumpers for vehicle doors, and is a division of application for Letters Patent filed by me May 24, 1929, Serial No. 365,726, for vehicle door bumpers.

It is broadly old to provide bumpers for doors in buildings either to prevent marring of the door and adjacent wall surface, when the door is swung wide open or to guard against the door marring or being marred by some adjacent door during the opening movement, but in these instances the object to which the door is attached being immovable there is no great problem in determining where to place the bumper in order that it may best serve its purpose. With a vehicle door, however, it is attached to an object, the very purpose of which is to enable persons to move about, from place to place and the conditions where the vehicle is parked or placed at various times also vary considerably. So far as I am aware it has not been proposed, prior to my invention, to provide bumpers for vehicle doors so arranged along the upright outer free marginal portions of the doors that when they are opened, adjacent to other objects such as parked vehicles, the bumper will absorb the shock incident to the engagement with an adjacent object, and neither the door nor the adjacent object will be damaged. In my co-pending application for patent this is broadly illustrated, described and claimed.

The principal object of this invention is to provide a simple and efficient vehicle door construction where the bumper is in part formed of material used in the manufacture of the door, in contra-distinction to bumpers of the character also shown in my said co-pending application Serial Number 365,726 which may be applied to the doors after the latter have been completed.

Other objects and advantages of the invention will appear in the following detailed description, taken in connection with the accompanying drawing, forming a part of this specification and in which drawing:

Figure 1 is a view in elevation of a vehicle door equipped with a bumper according to the present invention.

Figure 2 is an enlarged transverse sectional view showing the relation in which the bumper construction is cooperatively built in with the door.

Figure 3 is a fragmentary view partly in vertical section and partly in elevation looking toward the free edge of the door.

In the drawing, where similar reference characters designate corresponding parts thruout the views, A is the vehicle body portion; B the door hinged as at C and which in a closed position engages the body portion A; and D the bumper construction.

The door B may be of any approved design or construction having integral therewith an upright elongated bead 4 extending longitudinally of the free marginal portion 5 of the door at the outer face 6 and beyond the end face 7 of the door. This bead may be formed of the outer sheet or plate material 8 of the door, as by doubling the material upon itself as shown in Figure 2, to provide a neck portion 9 and a head portion 10 of the bead 4, and a marginal flange 11 for confronting relation to the door jamb or body portion A.

Mounted upon the bead 4 is a longitudinally split rubber tube 12. This tube is of any desired thickness, and is longitudinally split to permit the same being readily slipped upon the bead 4, the tube having an inherent tendency to embrace the head portion 10 of the bead so as to frictionally support itself upon the bead 4. If desired, the tube 12 may be cemented or otherwise secured in place.

While it may suffice to extend the bumper D upwardly from the lower margin of the door thruout the major portion of the height of the door, it is to be understood that this is merely by way of example, since the bumper may be constructed in part of other portions than merely the lower panel of sheet or plate material 8 of the door.

I claim:

1. As an article of manufacture, a vehicle door provided with hinge means along one marginal portion thereof, and a built in resilient bumper portion extending longitudinally along the opposite marginal portion thereof and at the outer face of the door.

2. In vehicle door construction, an outer wall plate shaped at its marginal portion to provide an integral bead extending longitudinally of the free marginal portion of the door, and a resilient bumper carried by said bead.

3. In vehicle door construction, an outer wall plate shaped to provide an outstanding bead along the free marginal portion of the door and including a neck portion and a head portion, and a longitudinally split rubber tube embracing said head portion and abutting opposite faces of said neck portion.

4. In vehicle door construction, a wall plate shaped to provide an outstanding bead along the outer free marginal portion of the door and a flange paralleling said bead for confronting relation to the door jamb, and a resilient bumper carried by said bead.

5. In vehicle door construction, a wall plate shaped to provide an outstanding bead along the free marginal portion of the door and including a neck portion and a head portion, and a flange paralleling said bead for confronting relation to the door jamb, and a longitudinally split rubber tube embracing said head portion of the bead and abutting opposite faces of the neck portion of the bead.

DUANE O. FARRINGTON.